United States Patent [19]
Bauernfeind et al.

[11] 3,851,102

[45] Nov. 26, 1974

[54] TIME-DIVISION MULTIPLEX TELEPHONE SYSTEM INCLUDING MEANS FOR RECORDING CHARGES

[75] Inventors: Herbert Bauernfeind, Nieder-Eschbach; Manfred Goller, Frankfurt/Main, both of Germany

[73] Assignee: Telefonbau und Normalzeit G.m.b.H., Frankfurt/Main, Germany

[22] Filed: Feb. 8, 1973

[21] Appl. No.: 330,830

[30] Foreign Application Priority Data

Feb. 16, 1972 Germany .......................... 2207101

[52] U.S. Cl. .......... 179/7.1 TP, 179/7 R, 179/7.1 R

[51] Int. Cl. .......................................... H04m 15/00

[58] Field of Search ... 179/15 AT, 7 R, 8 R, 7 MM, 179/7.1 R, 7.1 TP, 15 A

[56] References Cited

UNITED STATES PATENTS

| | | | |
|---|---|---|---|
| 3,324,242 | 6/1967 | Gattner | 179/7.1 |
| 3,342,939 | 9/1967 | Gattner | 179/7.1 R |

FOREIGN PATENTS OR APPLICATIONS

| | | | |
|---|---|---|---|
| 1,173,146 | 7/1964 | Germany | 179/7.1 R |
| 1,184,814 | 1/1965 | Germany | 179/7.1 R |

*Primary Examiner*—Kathleen H. Claffy
*Assistant Examiner*—Thomas D'Amico
*Attorney, Agent, or Firm*—Erwin Salzer

[57] ABSTRACT

A time-division multiplex telephone system is provided with automatic charge recording means particularly adapted to cooperate with means for transmission over a time-divided bus, or a timed-divided highway. The constituent parts of the charge recording means are under the same timing control as the sample transmitting means, i.e., the amplitude sample transmitters and the amplitude sample receivers. Charge pulses are transmitted from a central station to charge meters and the path of these pulses includes a pulse charge receiver, a first gate connecting the latter to a charge-pulse-transmitting bus, and a second gate connecting said bus to decoder which, in turn, is connected to a charge meter proper.

6 Claims, 2 Drawing Figures

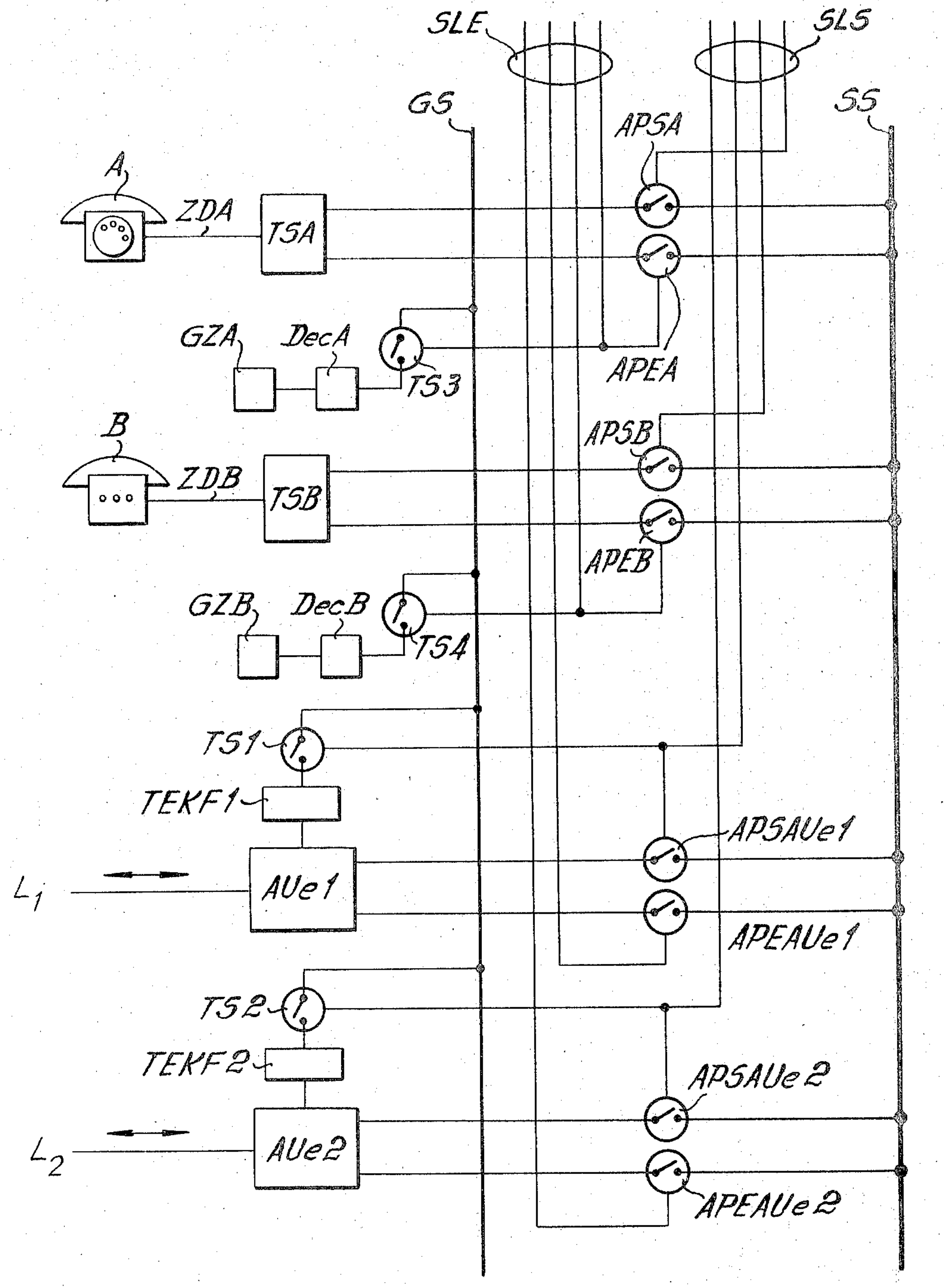
SLE
SLS
GS
SS
APSA
A
ZDA
TSA
GZA
DecA
TS3
APEA
APSB
B
ZDB
TSB
APEB
GZB
DecB
TS4
TS1
TEKF1
APSAUe1
L1
AUe1
APEAUe1
TS2
TEKF2
APSAUe2
L2
AUe2
APEAUe2

TIME-DIVISION MULTIPLEX TELEPHONE SYSTEM INCLUDING MEANS FOR RECORDING CHARGES

BACKGROUND OF THE INVENTION

A means for determining telephone charges for toll calls consists in transmitting charge pulses from a central station to normal subscriber stations and to the PBX stations connected to the central office. The frequency of these pulses may be 16 kilo Hertz. The larger the distance between the conversing parties, the higher the repetition rate of these counting pulses which are transmitted by timing control means and which may have a frequency of 16 kilo Hertz, as mentioned above. This system of accounting makes it possible to determine the chargers for automatic long distance service, or non-assisted long distance calls, as integer multiples of a unit service charge expressed in terms of one single counting pulse. In large PBX stations this system of accounting is being widely adopted because each extension station can be charged with the calls it caused to be set up. This, in turn, makes it possible to keep the charges for toll calls as low as possible.

One prior art system for private branch exchanges includes storage devices for storing toll counting pulses emanating from a central station, or a central telephone exchange. This prior art system makes it possible to determine the total charge for each toll call by measuring counting pulses and a permanent record of this information together with the number of the calling subscriber and that of the called subscriber is made. This record may be in the form of a punched tape, or may take some other appropriate format.

In another prior art telephone system charges are determined by counting pulses and identifying the calling subscriber station. In this system a request for registration of an accounting pulse is made along the same path and in the same fashion as a request for identifying a calling subscriber station. The subscriber identification means are used to determine the address of the subscriber station in a centrally located toll memory having as many locations for storing words as the number of subscriber stations connected to the central station of which the aforementioned memory forms a part.

Both referred-to above systems for determining telephone service charges are conceived for application in connection with space division telephone systems, and do not take account of the particular conditions prevailing in time-multiplex telephone systems.

The primary object of this invention is, therefore, to provide an automatic system for determining service charges which lends itself for application in connection with time-division multiplex systems and makes it possible to record service charges either at a central location, or at different locations.

Another object of the invention is to provide a system of the above description requiring but relatively simple storage means for storing telephone service charges.

SUMMARY OF THE INVENTION

A time-division multiplex telephone system embodying the present invention includes a plurality of subscriber stations each provided with its terminal equipment. The latter is connected by means of amplitude sample transmitting means including amplitude sample transmitters and amplitude sample receivers to a time-divided voice bus. The system includes further a plurality of special lines terminating in transfer units or office repeaters. The latter are connected to the time-divided bus in the same way as the above referred-to terminal equipment, i.e., by amplitude sample transmitting means including amplitude sample transmitters and amplitude sample receivers. Each transfer unit or office repeater is connected to a charge-pulse-receiver which, in turn, is connected by means of a first gate to a charge-pulse-transmitting bus. The latter is connected by the intermediary of second gates and decoders to charge meters of which each is intended to record the charges to be made to one of the subscriber stations. The system further includes means for controlling said first gates and said second gates in the rhythm of the aforementioned transmitting means, i.e. the aforementioned amplitude sample transmitters and amplitude sample receivers.

BRIEF DESCRIPTION OF THE DRAWING

The drawing shows in form of a block diagram the means for determining service charges in a time-division multiplex telephone system under the control of a central station or a central telephone exchange. The latter has not been shown in the drawing.

DESCRIPTION OF PREFERRED EMBODIMENT

In the drawing reference characters A and B have been applied to indicate two subscriber stations. It will be understood that the number of subscriber stations is actually much larger, and that the two subscriber stations shown in the drawing symbolize a larger number thereof. Subscriber stations A, B are connected by two-wire transmission paths ZDA and ZDB to their respective terminal equipment TSA and TSB. The outgoing lines of the line circuit TSA, TSB are connected to time-division multiplexing equipment including amplitude sample transmitters APSA and APSB, respectively, and amplitude sample receivers APEA and APEB, respectively. The time-division multiplex equipment allocates time slots to amplitude samples in accordance with the scanning theorem so that sampling occurs instantaneously at regular intervals and at a rate which is at least twice the highest significant voice frequency. Transmitters APSA and APSB collect and transmit voice amplitude samples from subscriber stations A, B and amplitude sample receivers APEA, APEB receive said samples and transmit the same to subscriber circuit TSA, TSB. The outgoing lines of amplitude sample transmitters APSA, APSB and the outgoing lines of amplitude sample receivers APEA, APEB are connected to time-divided voice bus or time-divided voice highway SS over which all telephone calls are made. The amplitude sample transmitters APSA, APSB are controlled by timing signals transmitted from a central station (not shown) over control lines SLS. In a similar fashion the amplitude sample receivers APEA, APEB are controlled by timing signals transmitted from a central station (not shown) over control lines SLE.

The aforementioned central station includes a connection storage system controlling amplitude sample transmitters APSA, APSB and amplitude sample receivers APEA, APEB over lines SLS and SLE. The above storage system is read out periodically. Each line in it stores the addresses of calling and called subscribers, the mode of their interconnection and other relevant information.

Special lines $L_1$, $L_2$ are connected to voice bus SS by the intermediary of transfer units or transmission circuit AUe1, AUe2, amplitude sample transmitters APSAUe1, APSAUe2 and amplitude sample receivers APEAUe1, APEAUe2. The connection between units AUe1, AUe2 and time-divided voice bus or time-divided voice highway SS is the same as that between terminal equipment TSA, TSB and the aforementioned bus or highway SS, and the former are also connected to charge-pulse-receivers TEKF1 and TEKF2, respectively, for receiving toll pulses which may have a frequency of 16 kilo Hertz, as mentioned above.

Reference character GS has been applied to indicate a charge-pulse-transmitting bus. The latter is connected to charge-pulse-receiver TEKF1 by the intermediary of first gate TS1 and connected to charge-pulse-receiver TEKF2 by the intermediary of first gate TS2. Gate TS1 is controlled by the same timing pulses as amplitude sample transmitter APSAUe1, both being connected to the same timing control line SLS, and first gate TS2 is controlled by the same timing pulses as amplitude sample transmitter APSAUe2, both being connected to the same control line SLS. Reference characters GZA, GZB have been applied to indicate charge meters for substations A, B. Charge meter GZA is connected to bus GS by the intermediary of second gate TS3 and decoder Dec A and charge meter GZB is connected to bus GS by the intermediary of second gate TS4 and decoder Dec B. Decoders Dec A and Dec B may be integrating devices for processing the pulse elements transmitted to them. Gate TS3 is controlled by the same timing pulses as amplitude sample receiver APEA, both being connected to the same timing control line SLE, and gate TS4 is controlled by the same timing pulses as amplitude sample receiver APEB, both being connected to the same control line SLE.

Assuming that subscriber station A is connected by means of transfer unit or repeater AUe1 to another party (whose station is not shown). In that instance the addresses of units A and AUe1 are recorded in the same line of a connection store. The latter may be a magnetic core store, or a MOSFET store operating in accordance with the principle of linear word selection. A fixed programmed store control causes sequential read-out of all the words which are stored in the store in periodic cycles and thereafter re-written into the store without change, if no change of the state of the connection is intended. Setting up a connection involves four phases, i.e., two connection phases and two intermediate phases. During a connection phase the addresses of the subscriber station A and of the transfer unit or line circuit AUe1 which are included in a stored word are decoded and used to send time control signals to amplitude sample transmitters APSA and APSAUe1, respectively, and to amplitude sample receivers APEA and APEAUe1, respectively, by way of control lines SLS and SLE, respectively. The spatial division of a four-wire connection is converted into a time sequence, i.e., distribution or division into two connecting phases. The intermediate phases referred-to above serve the purpose of separating the time slots and to meet the requirements of crosstalk. When a charge pulse reaches the charge-pulse-receiver TEKF1 by way of transfer unit or transmission circuit AUe1, such a pulse is sampled in the same rhythm as voice signals, the only difference being that it is further transmitted to bus GS. From there the pulse is further transmitted by way of second gate TS3 operated simultaneously with gate TS1 and decoder Dec A to charge meter GZA. The decoder Dec A reconstructs the original pulses from their single pulse elements.

In the system which has been illustrated and described above the gate TS3 transmitting charge signals to units Dec A and GZA is operated in the same rhythm as the amplitude sample receiver APEA, both being under the control of the same control line SLE. As an alternative, the rhythm of the amplitude sample transmitter APSA may be used to operate gate TS3 in which case the gate TS1 would be operated in the same rhythm as amplitude sample receiver APEAUe1 in order to connect unit or receiver TEKF1 to bus GS and to disconnect the former from the latter.

The first mentioned of the above referred-to possibilities or alternatives is particularly desirable if it is intended to use the timing pulses for the amplitude sample transmitter and of the amplitude sample receiver for purposes other than determining the time slots of these units. Such other purposes may include seizing the transfer unit or transmission circuit AUe1 by the timing pulses transmitted to amplitude sample receiver APEAUe, or releasing unit AUe1 when amplitude sample receiver APEAUe1 is blocked at the end of a call.

The meters GZA and GZB may be located in the central station or their locations may be decentralized. Meters GZA and GZB may be provided with print-out means or like devices, e.g. tape punches, for making paper records of accrued charges.

As mentioned above, gates TS3 and TS1 are operated simultaneously, this being necessary to allow the pulses from charge-pulse-receiver TEKF1 to reach charge meter GZA. The amplitude-sample-transmitter APSAUe1 and gate TS1 are operated simultaneously in order to transmit voice samples from transfer unit or transmission circuit AUe1 to subscriber station A. In order to receive these samples, amplitude sample receiver APEA must be opened. Thus in the first of two connecting phases elements APSAUe1 and APEA are operated, and in the second of these two phases elements APSA and APEAUe1 are operated.

We claim as our invention:

1. A time-division multiplex telephone system having automatic charge-recording means including a. a plurality of subscriber statins (A,B) each provided with terminal equipment (TSA, TSB);

b. a plurality of special transmission lines ($L_1$, $L_2$) each terminating in a transfer unit (AUe1, AUe2);

c. a time-divided voice bus (SS);

d. means for connecting said terminal equipment (TSA, TSB) of each of said plurality of subscriber stations (A, B) and for connecting said transfer unit (AUe1, AUe2) of each of said plurality of special lines ($L_1$, $L_2$) to said voice bus (SS), said connecting means including amplitude sample transmitters (APSA, APSB, APSAUe1, APSAUe2) and amplitude sample receivers (APEA, APEB, APEAUe1, APEAUe2), one of said amplitude sample transmitters and one of said amplitude sample receivers connecting said terminal equipment of each of said plurality of subscriber stations and connecting each said transfer unit of each of said plurality of special lines to said voice bus;

e. control lines (SLS) carrying timing signals to said amplitude sample transmitters (APSA, APSB, APSAUe1, APSAUe2) and control lines (SLE) carrying timing signals to said amplitude sample receivers (APEA, APEB, APEAUe1, APEAUe2) to sequentially allocate a time slot to one of said amplitude sample transmitters (APEA, APEB, APEAUe1, APEAUe2) and to one of said amplitude sample receivers (APEA, APEB, APEAUe1, APEAUe2);

f. a plurality of charge meters (GZA, GZB) each for one of said plurality of subscriber stations (A, B);

g. a plurality of charge-pulse-receivers (TEKF1, TEKF2) each connected to one of said transfer units (AUe1, AUe2) to receive charge pulses received by said transfer units;

h. a charge-pulse-transmitting bus (GS);

i. first gates (TS1, TS2) connecting said plurality of charge-pulse-receivers (TEKF1, TEKF2) to said charge-pulse-transmitting bus (GS);

j. means connecting said charge-pulse-transmitting bus (GS) to said plurality of charge meters (GZA, GZB) including decoders (Dec A, Dec B) and second gates (TS3, TS4); and k. conductor means interconnecting said control lines (SLS) carrying timing signals to said amplitude sample transmitters (APSA, APSB, APSAUe1, APSAUe2) and first gates (TS1, TS2) and conductor means interconnecting said control lines (SLE) carrying timing signals to said amplitude sample receivers (APEA, APEB, APEAUe1, APEAUe2) and said second gates (TS3, TS4) for controlling said first gates and for controlling said second gates by signals carried by said control lines.

2. A time-division multiplex telephone system as specified in claim 1 wherein said first gates (TS1, TS2) are operated simultaneously with one of said amplitude sample transmitters (APSAUe1, APSAUe2) of said transfer unit (AUe1, AUe2) of one of said plurality of special lines ($L_1$, $L_2$), and wherein said second gates (TS3, TS4) are operated simultaneously with said amplitude sample receivers (APEA, APEB) of said terminal equipment (TSA, TSB) of one of said subscriber stations (A, B).

3. A time-division multiplex system as specified in claim 1 wherein said first gates (TS1, TS2) are operated simultaneously with one of said amplitude sample receivers (APEAUe1, $APEAUe_2$) of said transfer unit (AUe1, AUe2) of one of said plurality of special lines ($L_1$, $L_2$), and wherein said second gates (TS3, TS4) are operated simultaneously with said amplitude sample transmitters (APSA, APSB) of said terminal equipment (TSA, TSB) of one of said subscriber stations (A, B).

4. A time-division multiplex system as specified in claim 1 wherein each of said plurality of charge meters (GZA, GZB) is arranged adjacent to one of said plurality of subscriber stations (A, B).

5. A time-division multiplex system as specified in claim 1 wherein each of said plurality of charge meters (GZA, GZB) is arranged in a central station remote from said plurality of subscriber stations.

6. A time-division multiplex system as specified in claim 1 wherein each of said plurality of charge meters is provided with a print-out-type device for making paper records of accrued charges.

* * * * *